A. L. SALTZMAN.
CONTROLLER MECHANISM FOR AUTOMATIC TYPOGRAPHIC APPARATUS.
APPLICATION FILED OCT. 6, 1904. RENEWED MAY 14, 1914.
1,115,475.
Patented Oct. 27, 1914.
3 SHEETS—SHEET 1.
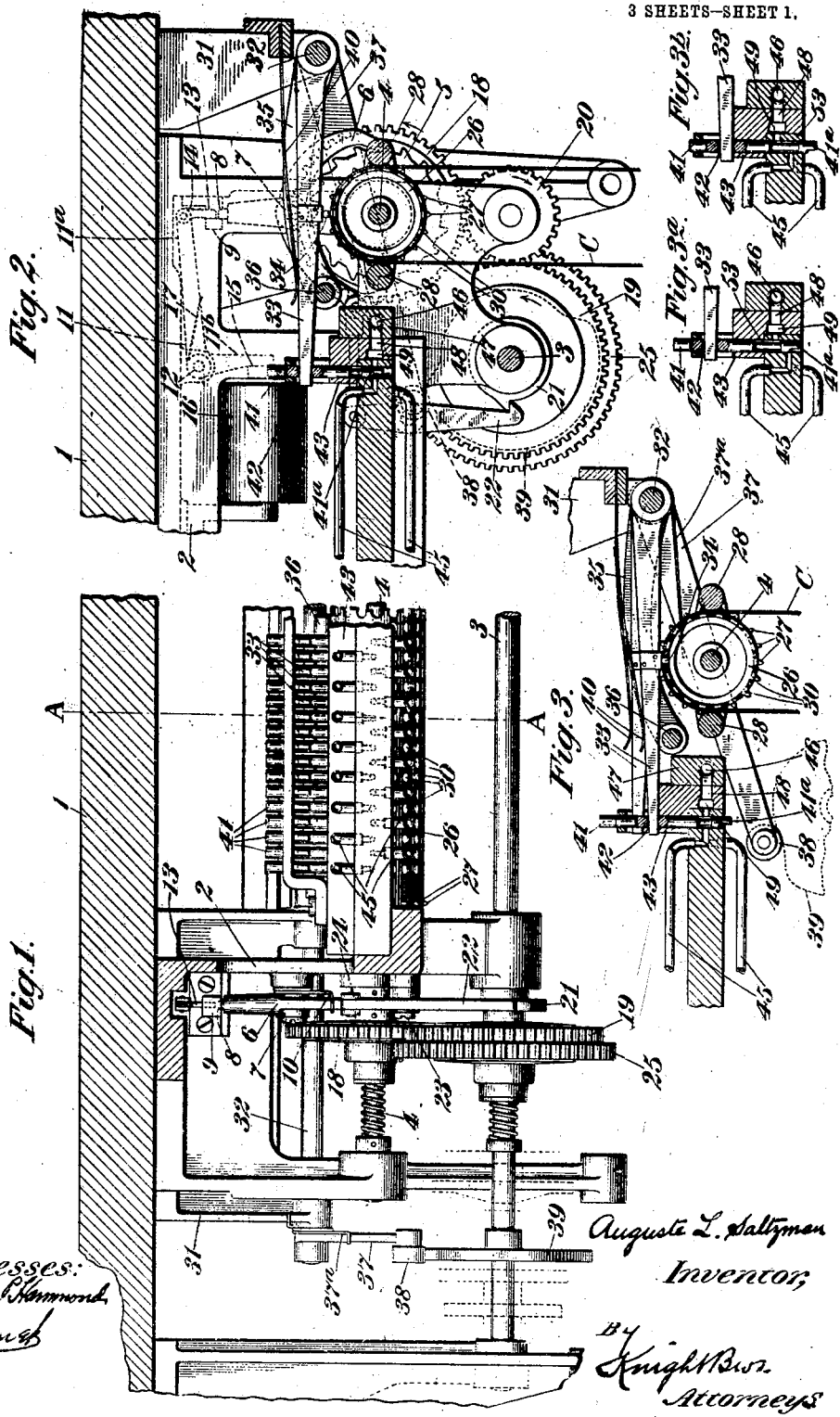

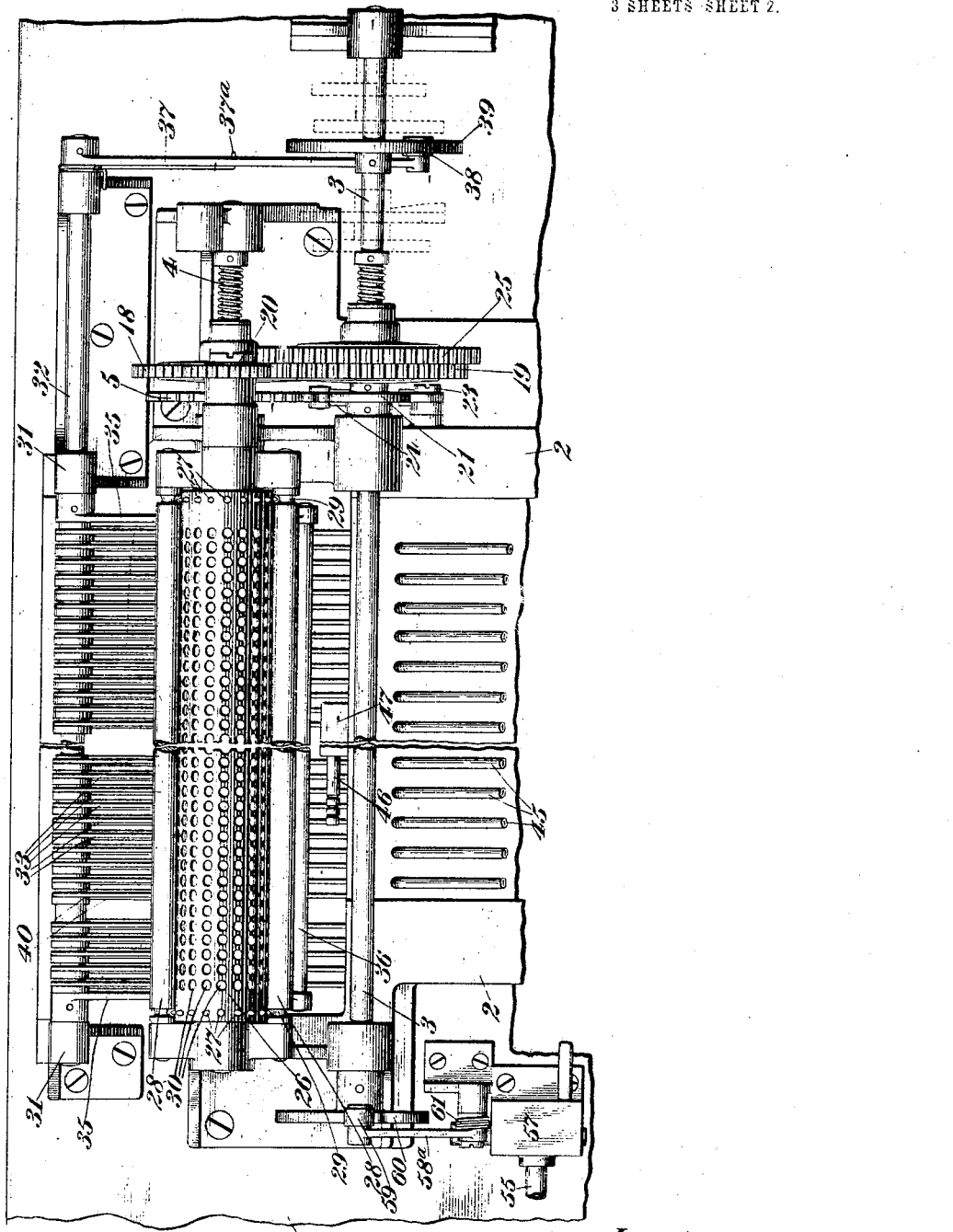

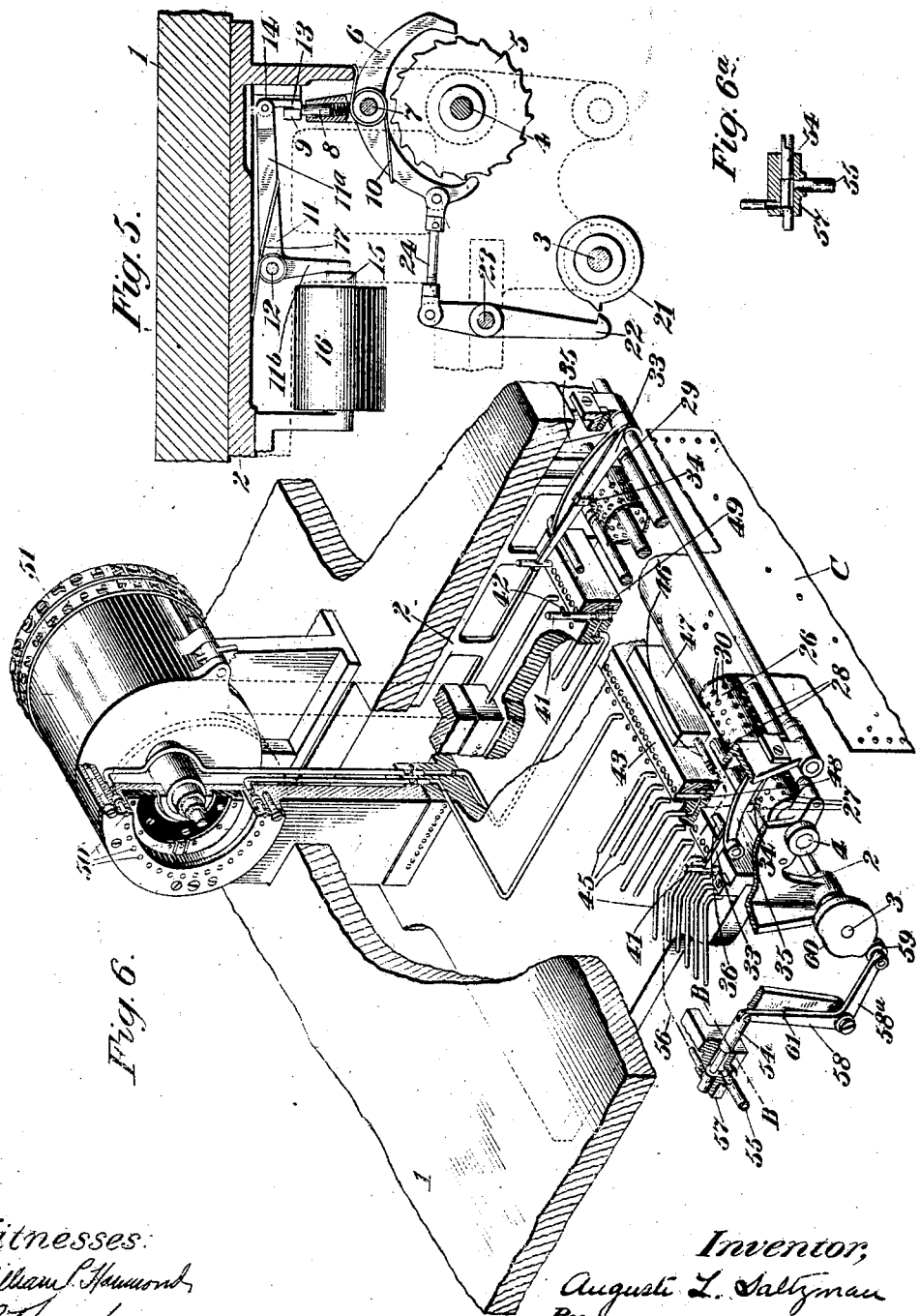

UNITED STATES PATENT OFFICE.

AUGUSTE L. SALTZMAN, OF EAST ORANGE, NEW JERSEY, ASSIGNOR, BY MESNE ASSIGNMENTS, TO JAMES G. COFFIN, TRUSTEE.

CONTROLLER MECHANISM FOR AUTOMATIC TYPOGRAPHIC APPARATUS.

1,115,475. Specification of Letters Patent. Patented Oct. 27, 1914.

Application filed October 6, 1904, Serial No. 227,455. Renewed May 14, 1914. Serial No. 838,619.

*To all whom it may concern:*

Be it known that I, AUGUSTE L. SALTZMAN, a citizen of the United States, and a resident of East Orange, Essex county, State of New Jersey, have invented a new and useful Improvement in Controller Mechanism for Automatic Typographic Apparatus, of which the following is a specification.

The invention relates to typographic machines and more particularly to machines which operate by a controller and employ fluid pressure means to select characters to be printed.

In certain of its aspects the invention relates to typographic machines having a rotatable type carrier although in certain of its aspects it relates also to other kinds of typographic machines.

The embodiment of the invention illustrated herewith by way of example is shown incorporated with the other parts of a typographic machine such as is illustrated and described in the application for patent Ser. No. 207,668 of Charles T. Moore, filed May 12, 1904. Certain parts shown in the drawings of this present application are substantially the same as those shown in the drawings of said application of Charles T. Moore, and the making and using of the present invention with such a machine will be clearly understood by those skilled in the art from the showing herewith.

Objects of the present invention are to provide a typographic machine having the printing mechanism, or parts thereof, quickly and reliably controlled by fluid pressure means working under the control of a controller; to provide such means in connection with a rotatable type carrier; to provide for a valve system which is positively controlled from the devices co-acting with the controller and according to certain features of the invention to provide valves which are moved positively with the parts that coöperate with the controller. Other objects of the invention will in part be obvious and will in part more fully appear hereinafter.

Of the drawings: Figure 1 is a fragmentary view partly in section and partly in elevation of parts of the mechanism designed to coöperate with the controller together with associated parts; Fig. 2 is a sectional view taken on line A A Fig. 1. Fig. 3 is a detailed sectional view, parts being removed to show more clearly the construction and operation. Figs. 3ª and 3ᵇ are sectional detail views showing modifications. Fig. 4 is a bottom plan view of the apparatus. Fig. 5 is a detail with parts removed, showing escapement mechanism in released position. Fig. 6 is a perspective showing the ducts connecting with mechanism controlling position of type carrier. Fig. 6ª is a detail sectional view on line B, B, (Fig. 6).

In the several views corresponding parts are indicated by the same reference numerals.

Suitable means for supporting and feeding a controller, together with connections to the other parts of the typographic machine are provided, and in the particular form thereof comprised in the illustrated embodiment, the main base plate of the automatic typographic apparatus is indicated by the numeral 1. In the brackets 2, secured upon the underside of the base-plate are journaled a cam shaft 3, and the controller feed-roll shaft 4. Secured fast upon the feed-roll shaft 4 is the escapement wheel 5. The escapement lever 6 for controlling the escapement of the feed-roll and thereby the feed of the controller, is pivoted upon a laterally projecting stud 7 on bracket 2. In the tail of the escapement lever is mounted a spring pin 8, which normally bears against a stop 9 secured upon the bracket 2. A spring 10 acting upon the escapement lever keeps the said pin 8 pressed against stop 9. A bell-crank lever 11 is pivotally mounted at 12 upon the bracket 2 and has its horizontal arm 11ª provided with a pivotally mounted plunger 13 in position to engage the stop 9. A spring 14 keeps said plunger pressed against said stop. The vertical arm 11ᵇ of the bell-crank 11 is provided with an armature 15 controlled by an electro-magnet 16, and a spring 17 acts upon the bell-crank 11 to keep the armature 15 away from the magnet 16, thereby keeping the plunger 13 in raised position. A friction gear 18 is mounted upon the feed-roll shaft 4, said friction gear being of such construction and having such connection with the shaft 4 that the gear runs idle except when the escapement mechanism permits an escapement of the feed-roll shaft. Cam shaft 3 is provided with a friction gear 19 meshing with an intermediate gear 20 which in turn meshes with gear 18 of the feed roll shaft. Cam shaft 3 is also provided with a friction gear 25 fast to gear 19 by which said cam shaft 3 and feed roll shaft 4 are operatively connected through a train of gears (not shown), to the main driving shaft of the typographic apparatus. The cam shaft 3 is provided with a one-tooth escapement wheel 21 with which engages an escapement lever 22 pivotally mounted at an intermediate point at 23 upon the bracket 2. The upper end of escapement lever 22 has pivotal connection with the escapement lever 6 by means of a tie-rod 24, see Fig. 5, so that operation of escapement lever 6 also causes an operation of escapement lever 22.

The above construction is similar to the construction of controller feed mechanism shown and described in said application for Letters Patent Ser. No. 207,668, and a further description of its operation is believed to be unnecessary, reference being had to the said application for Letters Patent.

As further parts of the embodied form of means for handling and coöperating with the controller there is shown herewith, secured upon the shaft 4 the feed-roll 26. This feed-roll is provided at its ends with sprocket teeth or pins 27 for engagement with the marginal feed perforations on the controller. Two presser rolls 28, 28 (Fig. 4) are journaled in the brackets 2, 2 and are each provided with peripheral grooves 29 at their ends adjacent the sprocket teeth 27, which permit said rolls 28 to be brought in close peripheral relation with the feed-roll. The controller C (Fig. 6) is fed over the feed-roll between the same and the presser roll 28, the sprocket pins 27 entering the marginal perforations of the controller. The feed-roll 26 is provided with a series of longitudinally arranged perforations 30, spaced apart one from the other a distance corresponding to the transverse lines on the controller upon which the character and other representations are made. For convenience the sprocket pins 27 are arranged to aline with the series of perforations 30 and also the transverse lines on the controller upon which the character and other perforations are arranged.

Suitably journaled in bracket 31 secured upon the underside of base-plate 1 is rock-shaft 32 extending parallel with the feed-roll. Loosely mounted upon said rock-shaft 32 is a series of drop-levers 33, which correspond in number to the number of perforations in a single series of perforations 30 in the feed-roll. At an intermediate point on each of said drop-levers is arranged a stud or point 34, these studs being in position to register with the series of perforations 30 in the feed-roll when they come into their uppermost position (see Fig. 3).

Secured to the rock-shaft 32 near each of its ends are arms 35, 35, which carry in their extremities a bail-rod 36. This bail-rod passes below all of the drop-levers 33.

To the rock-shaft 32 is secured an arm 37 carrying at its free extremity, a cam-roller 38 in position to be engaged by a cam 39 upon the auxiliary cam-shaft 3, said cam being provided with a depression to permit said arm 37 to drop and allow the points or studs 34 to rest upon the controller tape or ribbon on the feed-roll or drop through a perforation in controller as the case may be. Spring 37ᵃ acting on arm 37 tends to keep roll 38 in peripheral contact with cam 39. Springs 40 are provided one for each of the drop-levers 33, which press said levers into contact with the controller tape or ribbon on the feed-roll.

According to certain features of the invention, as hereinbefore indicated, it is contemplated to provide for positively actuating the valves according to the indications of the controller, and, more specifically, to provide for positively moving the valves which control the fluid under pressure. Accordingly a form of such means is included in the present embodiment. The embodied form of such means comprises certain of the parts already described as will be apparent, and comprises also a series of valves, one valve being provided for each lever 33. The forward end of each of the levers 33 as shown herein engages a valve stem 41 by means of a slot 42 formed in said stems, said valves being mounted in the valve block 43, supported by the brackets 2. The movement of the levers 33 and the valves 41 are limited in an upward direction by the rise of cam 39 and in a downward direction by the valve block itself, and by the lever studs coming into contact with the controller upon the feed-roll. The valves 41 control fluid pressure ducts 45, which lead to the respective operating parts of the typographic apparatus such as the positioning stops 50 for the type carrier 51, carrier shifting mechanism, line operating mechanism, etc. The fluid pressure supply ducts for said passages are connected with connections 46, 46 in a block 47 having a passage 48 which communicates with a passage 49 running longitudinally of the valves 41. Valves 41 are so constructed that in their upper position they close and in their lower position they open said communication and permit the fluid under pressure to pass to the parts connected with the particular valve which is operated. The ends 41ª of the valve are so shaped as to permit exhaust of fluid in the ducts 45 when a valve is in normal position as in Fig. 2. This prevents back-pressure, as for instance, when the type-carrier positioning means are restored.

With the valves 41 (as shown in Figs. 2 and 3) there is a tendency of the air-pressure to cause undue friction between the valve stem and its bearing or guides, requiring that springs 40 be of considerable strength to overcome this friction. This is a disadvantage for the reason that the employment of strong springs 40 may in some instances drive the studs or points 44 through the controller C where no perforation is present, thereby giving a false position to the type-carriers 51. In order to avoid this, I may provide valves 41 of a shape illustrated in Figs. 3ª and 3ᵇ, having reduced or recessed portions 53 of such a length that when the valve is in closed position (as in Fig. 3ª) the air-duct 49 opens against this reduced or recessed portion. The air-pressure at this point is thus equalized and there is no tendency to cause friction between the valve and its guides, thus springs 40 of sufficient strength only to insure the depression of drop-levers 33 on to the controller C and through the perforations therein are required.

Where valves 41 of the form shown in Figs. 1, 2 and 3 are employed I provide a controlling valve 54 (see Fig. 6). This valve 54 controls the supply of air or pressure-fluid from the reservoir to connection 46 and air-duct or passage 49 the air coming from the reservoir to the connection 55, thence to connection 56, thence to connection 46, as indicated by the dotted line Fig. 6. Valve 54 works in a suitable valve block 57 supported from the underside of baseplate 1, and is operated by a bell-crank lever, one arm 58 of which is pivotally connected with valve 54, the other arm 58ª carrying a cam-roller 59 which is arranged to bear upon a cam 60 mounted on shaft 3 by means of a spring 61. Cam 60 is so formed as to cause the valve 54 to open after the drop levers 33 have been allowed to drop by the bail-rod 36, so that no air-pressure passes to connection 46 and air-duct 48 until the valves 41 have been moved; thus there is no air-pressure to cause undue friction of valves 41. Cam 60 is also formed to close valve 54 before the valves 41 are raised, hence the pressure is removed or shut off from the valves 41 before the latter are raised.

The operation of the above described mechanism is as follows:—When the electro-magnet 16 is energized by the type carrier in the typographic apparatus coming to its normal or non-printing position, the feed-roll is permitted to escape one tooth thereby bringing a transverse line of impressions upon the controller into position beneath the studs or points 34 of the drop levers. When this occurs cam 39 is brought to a position to permit arm 37 to lower bail-rod 36, thereby permitting the drop levers to rest on their studs or points 34 upon the controller. Where perforations occur in this transverse line thus brought into operative position, the studs or points 34 on the drop levers drop through the perforations occurring in said line and through spring 40, these drop-levers are positively depressed operating corresponding valves 41 and opening passages 45 corresponding thereto, to the pressure fluid. The valves 41 are thus selectively operated by the perforations in the controller. A further operation of the cam shaft 3 causes cam 39 to raise arm 37 and bail-rod 36, thereby raising all of the drop-levers and their studs or points 34 off the controller tape. The latter part of revolution of said cam shaft releases the type-carrier from its normal or non-printing position and causes said carrier to be positioned against stops set by the aforementioned valves. When the type carrier has completed its cycle of movement and again reaches its normal or non-printing position the electro-magnet is again energized causing escapement of the feed roll and cam shaft, the feed-mechanism acting to feed a new line of perforations into position and the cam-shaft permitting the bail-rod 36 to drop the points or studs on the drop-levers upon the controller or through perforations.

By the above described mechanism, it will be seen that instead of the controller itself acting as a valve the perforations therein are caused to control valves. Thus the above mentioned defects and disadvantages are eliminated and positive action of the selected mechanisms in the typographic apparatus is insured.

While I have shown specific mechanisms, I desire it to be understood that my invention is not restricted to the specific devices shown, but that any equivalent means accomplishing substantially the same results, may be used without departing from the spirit and scope of my invention.

Having thus described my invention what I claim as new and desire to protect by Letters Patent is the following:—

1. A typographic machine adapted to be controlled by a controller, including in combination a type carrier, means for moving said type carrier, positioning means for said type carrier, a series of valves corresponding to typographic characters, and automatic means selectively operated by the controller for actuating said valves in accordance with a typographic composition to cause said positioning means to position said type carrier.

2. A typographic machine, adapted to be controlled by a controller, including in combination a traveling type carrier having a plurality of characters thereon, a series of valves corresponding to the typographic characters on said type carrier, arresting means for said type carrier, and automatic means controlled by said controller for actuating said valves to actuate said arresting means.

3. In a machine of the character described a series of valves corresponding to typographic characters and to word spaces and other functions, and automatic means connected mechanically to said valves, said means being selectively operated to actuate said valves in accordance with a typographic composition.

4. A typographic machine, adapted to be controlled by a controller, including in combination a series of valves corresponding to typographic characters and to word spaces and other functions, and automatic means mechanically connected to said valves for actuating said valves, said means being controlled by the controller.

5. In a machine of the character described, a traveling type carrier, a plurality of positioning means therefor, fluid-pressure means for actuating said positioning means, a series of valves for controlling said fluid-pressure means, and means selectively operated by said controller for operating said valves.

6. A typographic machine including in combination a type carrier constructed and arranged to present various characters in position for impression, means for bringing the type and paper into impression contact, fluid-pressure means for positioning the said carrier, a series of valves for controlling said fluid-pressure means, means for holding a controller, and means selectively operated by said controller for operating said valves to position the type carrier.

7. A typographic machine, including in combination means for supporting a controller, a series of devices constructed and arranged to coöperate with marks or perforations upon said controller, and a series of valves corresponding to said devices, the said parts being constructed and arranged so that the said devices will actuate the said valves in accordance with marks or perforations upon the controller to control the typographic machine.

8. A typographic machine including in combination a controller feed mechanism, devices constructed and arranged to coöperate with marks or perforations upon the controller, a series of valves corresponding to said devices and operated thereby, and means for bringing the said devices into operative engagement with said controller between the feed movements thereof.

9. A typographic machine including in combination a carrier provided with a plurality of types and having a rotary movement to bring a particular type to the impression position, means controlled by fluid under pressure for governing the rotary movement of the type carrier, a series of valves for controlling the fluid under pressure, and means controlled by a controller for governing the said valves.

10. A typographic machine including in combination a carrier provided with a plurality of types and having a rotary movement to bring a particular type to the impression position, means controlled by fluid under pressure for governing the rotary movement of the type carrier, a series of valves for controlling the fluid under pressure, and means controlled by the controller for simultaneously actuating a plurality of the said valves.

11. In a machine of the character described, a controller feed mechanism, a series of arms having means thereon for coöperating with marks or perforations upon said controller, a series of valves corresponding to said arms and operated thereby and means for removing said arms from operative engagement with said controller between the feed movements thereof.

12. In a machine of the character described, mechanism for feeding a controller, a series of arms having projections thereon arranged to engage said controller and register with marks or perforations thereon, a series of ducts corresponding with said arms, and a valve for each duct having engagement with one of said arms.

13. In a machine of the character described, a feed roll or drum having a series of recesses arranged longitudinally in the periphery thereof, means to hold a controller in driving contact with the periphery of said drum with the recesses in the drum in registry with the marks or perforations in the controller, a series of pivotally mounted arms having studs thereon in position to register with the series of recesses in the drum when the same are brought into operative position, a series of ducts and a corresponding series of valves for controlling said ducts, said valves having engagement with said arms.

14. In a machine of the character described, a type carrier, means for positioning the same in accordance with a typographic composition, a series of ducts leading to said positioning means and a corresponding series of valves for controlling said ducts, feeding mechanism for a controller, having a typographic composition represented thereon, and means selectively operated by the representations on the controller and having engagement with said valves.

15. In a machine of the character described, a feed roll or drum having recesses in the periphery thereof arranged in a series of longitudinal lines, means for holding a controller in driving contact with said drum, and means for causing the typographic representations on said controller to register with the recesses on said drum, a series of pivotally mounted arms having projections thereon in position to register with the lines of recesses on said drum when the latter reach the operative position, means for causing said projections to engage the controller between successive feed movements thereof, a series of ducts, a corresponding series of type carrier positioning means connected with the ducts, a valve for each duct to control the same, said valves having engagement with the said arms, said arms being selectively operated by the typographic representations on the controller whereby a plurality of arms register with the perforations on the controller in any of its operative positions and simultaneously engage corresponding recesses in the drum and actuate the valves, the blank portions of the controller preventing the other arms of the series from operating their valves.

16. In a machine of the character described, a feed roll or drum having recesses in the periphery thereof, an escapement mechanism for controlling the movements of said drum and bringing said lines successively into operative position, means on said drum for causing transverse lines of the controller to register with the recesses, a series of ducts, type carrier positioning means connected with said ducts, a series of valves for controlling said ducts, a series of pivotally mounted arms having studs thereon in position to register with the recesses in the drum, said arms having operative engagement with said valves, and means for causing said arms to engage the controller between its feed movements and to raise said arms out of engagement with the controller during the operation of the escapement mechanism.

17. In a machine of the character described, a series of ducts, a series of valves for controlling said ducts, means for feeding a controller, means selectively operated by the controller for operating said valves, and means for relieving said valves from lateral pressure prior to their operation.

18. In a machine of the character described, a type carrier, fluid pressure operated means for positioning said type carrier, valves for controlling said fluid pressure, and means for relieving said valves of friction due to the fluid pressure.

19. In a machine of the character described, a type carrier, fluid pressure operated means for positioning said carrier, valves controlling said fluid pressure, and automatically operated means for relieving said valves of friction due to the fluid pressure before and after their operation.

20. In a machine of the character described, a type carrier, fluid pressure operated means for positioning said carrier, a controller and feeding means therefor for controlling the operation of said valves, and automatically operated means for shutting off the fluid pressure from the said valves during feed movements of the controller.

21. A typographic machine including in combination a rotatable carrier provided with a plurality of types, means controlled by fluid pressure for positioning the type carrier so that it will present a particular type at the impression position, a series of valves corresponding to the various characters, and means controlled by a controller for governing the said valves.

22. A typographic machine including in combination a rotatable carrier provided with a peripherally arranged series of types, means controlled by fluid pressure for positioning the type carrier so that it will present a particular type at the impression position, a series of valves corresponding to the various characters, and means controlled by a controller for governing the said valves.

23. A typographic machine including in combination a controller, a series of valves, and a valve actuating member connected to each of said valves and coöperating directly with said controller for operating the valves.

24. A typographic machine including in combination a controller, a series of valves, and a spring pressed valve actuating member connected to each of said valves, and coöperating directly with said controller for operating the valves.

25. A typographic machine including in combination a rotatable type carrier, a plurality of devices circularly arranged and fluid pressure operated, for controlling the type carrier, a controller, mechanical means co-acting with said controller for controlling the action of the fluid pressure upon said devices.

26. A typographic machine including in combination a movable type carrier, a plurality of pneumatically operated members for positioning the respective types at impression, a series of valves for controlling the action of the air on said members, a controller, and mechanical connections for actuating said valves, said mechanical connections being controlled by said controller.

27. A typographic machine including in combination a type carrier under impulsion to travel, means which may be moved to position to permit such travel or to arrest the travel in order to present a selected type for impression, pneumatic devices for moving said permitting and preventing means, a plurality of valves for controlling said pneumatic devices, a controller, and connections controlled by said controller for actuating said valves.

28. A typographic machine including in combination a movable type carrier, a plurality of pneumatically operated members for positioning the respective types at impression position, a series of valves corresponding to respective types on the type carrier for controlling the action of the air on said positioning members, a controller, and means coacting with the controller for simultaneously actuating a plurality of valves whereby a plurality of types are successively positioned for impression.

29. A typographic machine including in combination a rotating type carrier, an arm rotating with said type carrier, a plurality of members at different points along the path of said arm movable into and out of position to engage and stop said arm, pneumatic devices for moving said members, a series of valves for controlling the action of said pneumatic devices, a controller, and devices controlled by said controller for actuating said valves.

30. A typographic machine including in combination a rotating type carrier, an arm rotating with said type carrier, a plurality of stops arranged substantially in a circle along the path of said arm, a series of ducts corresponding to said stops, a valve in each duct, a controller and means coöperating with and controlled by said controller to selectively actuate the respective valves.

31. A typographic machine including in combination a rotating type carrier, an arm rotating with said type carrier, a plurality of stops arranged substantially in a circle along the path of said arm, a series of ducts corresponding to said stops, a series of valves arranged in substantially a straight line, a cylinder and a controller traveling thereover, and means coöperating with and controlled by said controller to selectively actuate the respective valves.

32. A typographic machine including in combination a rotating type carrier, an arm rotating with said type carrier, a plurality of stops arranged substantially in a circle along the path of said arm, a series of ducts corresponding to said stops, a series of valves arranged in substantially a straight line, a cylinder and a controller traveling thereover, and a series of levers coöperating with and controlled by said controller to actuate the respective valves.

33. A typographic machine adapted to be controlled by the controller including in combination a type carrier, actuating means therefor, positioning means therefor, a series of valves corresponding to typographic characters and to word spaces and other functions, and means selectively operated by the controller for positively actuating said valves in accordance with a typographic composition.

34. A typographic machine including in combination an intermittently moving controller, a moving type carrier, a plurality of valves corresponding to typographic characters, actuating means for said valves coöperating with the controller while it is at rest and a fluid pressure operated device for stopping said type carrier.

35. A typographic machine including in combination a controller, a traveling type carrier having a plurality of characters, means for traveling the type carrier, fluid controlled means for positioning a character for impresion, and a valve controlled by said controller for controlling the action of the fluid on said positioning means.

36. A typographic machine adapted to be controlled by a perforate controller strip, a perforate member over which the controller strip travels, a spring pressed lever bearing on the opposite side of the controller strip from said perforate member and adapted to enter the perforations in said controller, and a valve actuated by said lever.

37. A typographic machine adapted to be controlled by a perforate controller strip, a perforate member over which the controller strip travels, a spring pressed lever bearing on the opposite side of the controller strip from said perforate member, and adapted to enter the perforations in said controller and a valve engaged and moved by said lever.

38. A typographic machine adapted to be controlled by a perforate controller strip, a perforate cylinder over which said controller travels, a spring pressed lever bearing on said controller where the controller passes on the cylinder and a valve actuated by said lever.

39. A typographic machine adapted to be controlled by a perforate controller strip, a perforate member over which the controller strip travels, a spring pressed lever bearing on the opposite side of the controller strip from said perforate member and adapted to enter the perforations in said controller, a valve actuated by said lever, a traveling type carrier, and fluid pressure operated positioning means for said carrier, the action of the fluid pressure upon said positioning means being controlled by said valve.

40. A typographic machine adapted to be controlled by a perforate controller strip, a type carrier, fluid pressure operated means for controlling said type carrier, a controller having a plurality of character indicating devices on a single transverse line, a valve for each character indicating device, and means controlled by a single character indicating device for actuating a valve.

41. A typographic machine adapted to be controlled by a perforate controller strip, a type carrier, fluid pressure operated means for controlling said type carrier, a controller having character indicating devices, a valve for said fluid pressure means and actuating means for said controller actuated by a single character indicating device.

AUGUSTE L. SALTZMAN.

Witnesses:
HENRY C. WORKMAN,
F. E. DRISCOLE.